United States Patent
Norbeck et al.

(10) Patent No.: US 8,771,388 B2
(45) Date of Patent: Jul. 8, 2014

(54) METHOD TO PRODUCE METHANE RICH FUEL GAS FROM CARBONACEOUS FEEDSTOCKS USING A STEAM HYDROGASIFICATION REACTOR AND A WATER GAS SHIFT REACTOR

(75) Inventors: Joseph M. Norbeck, Palm Desert, CA (US); Chan Seung Park, Yorba Linda, CA (US); Arun S K Raju, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 625 days.

(21) Appl. No.: 12/783,228

(22) Filed: May 19, 2010

(65) Prior Publication Data

US 2011/0126458 A1 Jun. 2, 2011

Related U.S. Application Data

(63) Continuation-in-part of application No. 11/879,241, filed on Jul. 16, 2007, now Pat. No. 8,268,026, which is a continuation-in-part of application No. 11/489,289, filed on Jul. 19, 2006, now Pat. No. 7,771,573, application No. 12/783,228, which is a continuation-in-part of application No. 10/911,348, filed on Aug. 3, 2004, now Pat. No. 7,500,997, which is a continuation-in-part of application No. 10/503,435, filed as application No. PCT/US03/03489 on Feb. 4, 2003, now Pat. No. 7,208,530, application No. 12/783,228, which is a continuation-in-part of application No. 11/879,266, filed on Jul. 16, 2007, now Pat. No. 7,897,649, which is a continuation-in-part of application No. 11/489,308, filed on Jul. 18, 2006, now abandoned, application No. 12/783,228, which is a continuation-in-part of application No. 12/286,165, filed on Sep. 29, 2008, now Pat. No. 8,118,894, which is a continuation-in-part of application No. 11/879,456, filed on Jul. 16, 2007, now abandoned, which is a continuation-in-part of application No.

(Continued)

(51) Int. Cl.
*C01B 3/00* (2006.01)
*C01B 3/24* (2006.01)
*B01J 7/00* (2006.01)

(52) U.S. Cl.
USPC ............. 48/197 R; 48/210; 423/644; 423/650

(58) Field of Classification Search
USPC ........................................ 48/197 R
See application file for complete search history.

(56) References Cited

U.S. PATENT DOCUMENTS

| 7,208,530 B2 | 4/2007 | Norbeck et al. | |
| 2004/0035055 A1* | 2/2004 | Zhu et al. | 48/127.9 |
| 2004/0131912 A1* | 7/2004 | Keefer et al. | 429/34 |

OTHER PUBLICATIONS

A.S.K. Raju, C.S. Park and J.M. Norbeck, Synthesis Gas Production using Steam Hydrogasification and Steam Reforming, Accepted, Fuel Proc. Tech., 2008.

(Continued)

*Primary Examiner* — Matthew Merkling
(74) *Attorney, Agent, or Firm* — Fish & Tsang, LLP

(57) ABSTRACT

A method for producing high levels of methane based on a combination of steam hydrogasification and a shift reactor is provided. Hydrogen produced by the shift reactor can be recycled back into the steam hydrogasifier.

13 Claims, 1 Drawing Sheet

Related U.S. Application Data

11/489,299, filed on Jul. 18, 2006, now abandoned, application No. 12/783,228, which is a continuation-in-part of application No. 12/218,653, filed on Jul. 16, 2008, now Pat. No. 8,143,319, which is a continuation-in-part of application No. 11/879,267, filed on Jul. 16, 2007, now Pat. No. 7,619,012, which is a continuation-in-part of application No. 11/489,353, filed on Jul. 18, 2006, now abandoned, application No. 12/783,228, which is a continuation-in-part of application No. 11/635,333, filed on Dec. 6, 2006, now Pat. No. 8,349,288, and a continuation-in-part of application No. 12/400,640, filed on Mar. 9, 2009, now Pat. No. 8,603,430.

(60) Provisional application No. 61/180,010, filed on May 20, 2009, provisional application No. 60/355,405, filed on Feb. 5, 2002.

(56) References Cited

OTHER PUBLICATIONS

"Key World Energy Statistics," International Energy Agency, 2008.
J. L. Figueiredo and J. A. Moulijn, "Carbon and Coal Gasification," in NATO ASI Series: Martin Nijhoff Publishers, 1986.
C. Higman and M. van der Burgt, Gasification: Elsevier, 2003.
P. L. Walker Jr., F. Ruskino Jr., and L. G. Austin, "Gas reactions of carbon," Advances in Catalysis, vol. 11, pp. 133-221, 1959.
E. P. Deurwaarder, H. Boerrigter, H. Mozaffarian, and B. van der Drift, "Methanation of Milena product gas for the production of bio-SNG," in 14th European Biomass Conference & Exhibition Paris, France, 2005.
S. K. Jeon, C. S. Park, C. E. Hackett, and J. M. Norbeck, "Characteristics of steam hydrogasification of wood using a micro-batch reactor," Fuel, vol. 86, pp. 2817-2823, 2007.

* cited by examiner

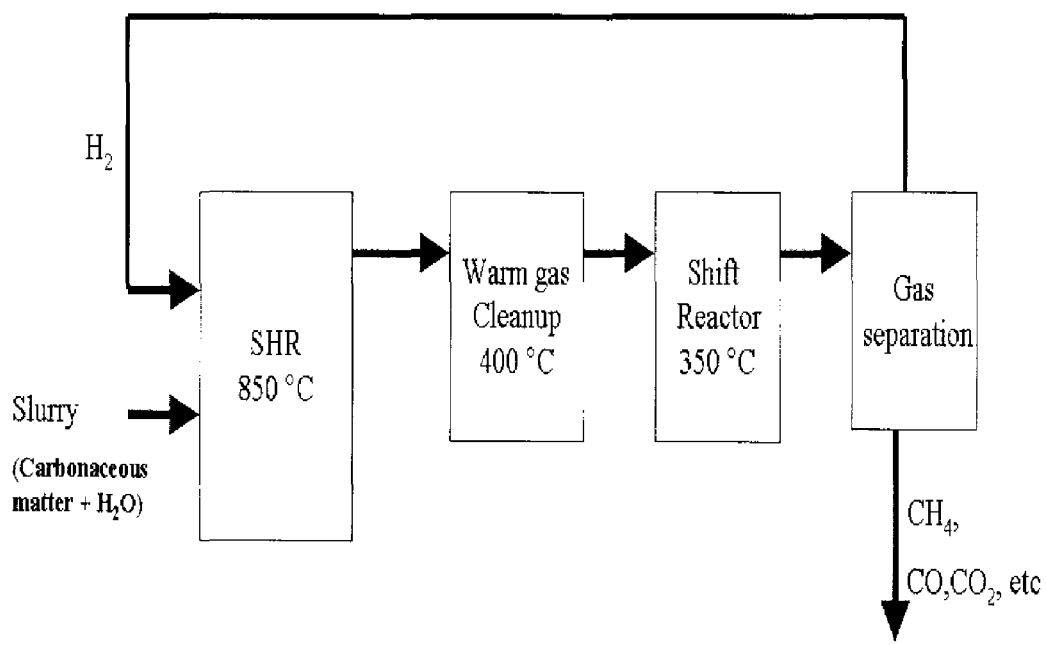

METHOD TO PRODUCE METHANE RICH FUEL GAS FROM CARBONACEOUS FEEDSTOCKS USING A STEAM HYDROGASIFICATION REACTOR AND A WATER GAS SHIFT REACTOR

CROSS-REFERENCE TO RELATED APPLICATIONS

This application claims the benefit of U.S. Provisional application 61/180,010, filed on May 20, 2009, which is hereby incorporated by reference in its entirety.

This application is also a continuation-in-part of, and claims the benefit of, patent application Ser. No. 11/879,241, filed Jul. 16, 2007, which is a continuation-in-part of, and claims the benefit of, patent application Ser. No. 11/489,298, filed Jul. 18, 2006; is a continuation-in-part of, and claims the benefit of, patent application Ser. No. 10/911,348, filed Aug. 3, 2004, which is a continuation-in-part of, and claims the benefit of U.S. Pat. No. 7,208,530 which was reissued as RE40419, which claims the benefit of Provisional application 60/355,405, filed Feb. 5, 2002; is a continuation-in-part of, and claims the benefit of, patent application Ser. No. 11/879,266, filed Jul. 16, 2007, which is a continuation-in-part of, and claims the benefit of, application Ser. No. 11/489,308, filed Jul. 18, 2006; is a continuation-in-part of, and claims the benefit of, patent application Ser. No. 12/286,165, filed Sep. 29, 2008, which is a continuation-in-part of, and claims the benefit of, application Ser. No. 11/879,456 filed Jul. 16, 2007, which is a continuation-in-part of, and claims the benefit of, application Ser. No. 11/489,299 filed Jul. 18, 2006; is a continuation-in-part of, and claims the benefit of, patent application Ser. No. 12/218,653, filed Jul. 16, 2008, which is a continuation-in-part of, and claims the benefit of patent application Ser. No. 11/879,267, filed Jul. 16, 2007, which is a continuation-in-part of, and claims the benefit of, application Ser. No. 11/489,353, filed Jul. 18, 2006; and is a continuation-in-part of, and claims the benefit of, patent application Ser. No. 11/635,333, filed Dec. 6, 2006; and is a continuation-in-part of, and claims the benefit of, patent application Ser. No. 12/400,640, filed on Mar. 9, 2009.

All of the above cited applications are incorporated herein by reference in their entirety.

FIELD OF THE INVENTION

The field of the invention is the production of methane rich fuel gas.

BACKGROUND OF THE INVENTION

Natural gas accounts for approximately 20% of the world energy consumption and is the third largest used fuel after oil and coal [1]. The United States is the second largest producer of natural gas in the world, with an annual production of 546 billion cubic meters (bcm). In addition to the domestic production, the U.S. is also the largest importer of natural gas, at 130 bcm per year [1]. Natural gas prices have steadily increased over the past decade. Synthetic natural gas produced from coal at competitive prices will be an attractive option since this can be accomplished using domestic feedstocks. The production of methane from coal for use as synthetic natural gas (SNG) has been studied for many years and the interest was especially high during the 1970s and 80s.

Limitations of the Conventional Processes for SNG Production

Hydrogasification: The primary thermo-chemical process used for the production of synthetic natural gas from coal was hydrogasification. Hydrogasification was originally developed in the early 1900s and there was a revived interest in the process during the 1970s and 80s as a result of increasing natural gas prices. The basic reaction is the direct methanation of carbon, as shown below [2].

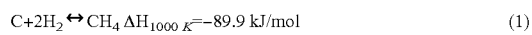

$$C + 2H_2 \leftrightarrow CH_4 \; \Delta H_{1000\,K} = -89.9 \text{ kJ/mol} \tag{1}$$

Although this reaction is mildly exothermic, significant amount of energy must be spent in bringing the reactants up to temperature and also to sustain the process. Methane production is favored at high pressures and the process is generally operated at temperatures ranging from 750° C. to 1000° C. [3]. A number of processes were developed and a few of these were operated satisfactorily in pilot plant scales. A major issue with hydrogasification processes was the source of hydrogen supply since hydrogen production can be expensive. Natural gas prices also dropped during this period. In addition to the hydrogen supply issues and cheap natural gas, hydrogasification was not very attractive due to the much slower reactivity of carbon with hydrogen compared to other gasifying agents. The reactivity of carbon with different species at 1073 K and 0.1 atmospheres are shown below [4].

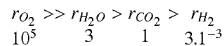

$$r_{O_2} \gg r_{H_2O} > r_{CO_2} > r_{H_2}$$
$$10^5 \quad\quad 3 \quad\quad 1 \quad\quad 3.1^{-3}$$

Methanation of Partial Oxidation Product gas: Oxygen or air blown processes are the primary focus of current gasification development, especially in commercial and large scale demonstration projects. The oxygen blown processes are commonly known as partial oxidation (POX) technologies and offer high carbon conversions under low residence times in the reactor. However, these processes generate a synthesis gas (syngas) with very low methane content. Hence, these processes can be used for methane production only by means of downstream methanation. Methanation processes are not considered to be an effective means of synthetic natural gas production due to different reasons including relatively poor efficiency under desired process conditions [5].

Based on the above discussions, it is evident that for SNG production to be commercially viable, the gasification process must solve the two major technical problems faced by conventional hydrogasification processes and methanation process. These problems are the difficulties in the supply of hydrogen in an inexpensive and simple manner and also the low carbon conversions observed during conventional hydrogasification based processes.

BRIEF SUMMARY OF THE INVENTION

This invention provides a process for providing a high concentration methane, between 0.2 to 40% on a mole basis, where conventional problems associated with hydrogen supply and low carbon conversions are overcome.

In one embodiment of the invention, a process for converting carbonaceous material into methane-rich fuel gas is provided involving simultaneously heating in a hydrogasification reactor the carbonaceous material in the presence of both hydrogen and steam, at a temperature and pressure sufficient to generate a stream of methane and carbon monoxide rich product gas, In more particular embodiments, the carbonaceous material is provided in slurry form.

In another embodiment, the process further includes feeding the product gas to a shift reactor, wherein the CO rich gas product reacts with steam to produce $H_2$. In a more particular embodiment, the hydrogen produced by the shift reactor is recycled back into the hydrogasification reactor.

In yet other embodiments, catalysts, hot solid, or injection of oxygen into the hydrogasifier is not required.

The composition of the product gas from steam hydrogasification reaction can be controlled by varying the steam to carbon and the $H_2$ to carbon ratio of the feed. The carbonaceous material used in the invention can be municipal waste, biomass, wood, coal, biosolids, or a natural or synthetic polymer.

In another embodiment, an apparatus for converting carbonaceous material into methane-rich fuel gas is provided including a steam hydrogasification reactor and a shift reactor. In a more particular embodiment, a gas clean-up unit is also provided.

BRIEF DESCRIPTION OF THE DRAWINGS

For a more complete understanding of the present invention, reference is now made to the following descriptions taken in conjunction with the accompanying drawing, in which:

FIG. 1 shows one embodiment of the invention.

DETAILED DESCRIPTION OF THE INVENTION

This invention provides a new method for producing SNG based on a combination of hydrogasification and steam pyrolysis reactions, and is called steam hydrogasification reaction (SHR) [6, 7]. The configuration of these processes allow the use of recycled hydrogen as feed, thus eliminating the hydrogen supply problem.

Steam pyrolysis and hydrogasification are well known gasification processes but have not been considered to be viable technologies for commercial SNG production due to several issues. UCR's CE-CERT has shown that the hydrogasification of carbonaceous matter in the presence of steam significantly enhances the rate of methane formation [8]. This process, called steam hydrogasification, generates a product gas stream with high methane content. The composition of the product gas from steam hydrogasification reaction can be controlled by varying the steam to carbon and the $H_2$ to carbon ratio of the feed. Methane content of the SHR product gas can be varied from 0.2 to 40%; preferably 10-40%, more preferably, 30-40% on a dry mole basis. The product gas also contains CO, $CO_2$, $H_2$ and considerable amount of unreacted steam.

In present invention of the SHR gasifier, the carbonaceous feed is transported into the reactor in a slurry form, which consists of carbonaceous material that has been chopped, milled or ground into small particles, and mixed with water. Instead of using water to form a slurry, other forms of diluent can be used, such as but not limited to, algae obtained from algae farms (where water comprises a large component of the material), raw sewage waste, and sewage associated products generated from a waste water treatment facility (such as but not limited to, dissolved air floatation thickener (DAFT) and Belt Pressed Cake (BPC)).

A slurry is a mixture of carbonaceous solid material and liquid (preferably water). In various embodiments, the slurry can be pumpable, and/or have a viscosity less than or equal to 1.0 Pa·s or less than or equal to 0.7 Pa·s. The rheological properties of a slurry are dependant on the type of solid material, solid loading, solid particle size and size distribution, temperature, and additives. For example, in some embodiments, the maximum solid loading of coal-water, biomass-water, pretreated biomass-water, and comingled biomass and coal slurries are: a) a maximum solid loading of 65 wt % at 0.7 Pass can be achieved for the coal-water slurry, and 12.5 wt % for the biomass-water slurry; b) solid loading in pretreated biomass-water slurry can increase to about 35 wt %, and when comingled with coal, solid loading can increase to about 45 wt %.

The slurry form eliminates the need for cumbersome reactor feed systems such as a lock hopper. This also simplifies feedstock processing since drying the feed is not necessary. A portion of the necessary steam can enter the hydrogasification reactor as liquid water that is part of the slurry and the rest of the steam is superheated, for instance by a steam generator, and fed along with the hydrogen. In another embodiment, all the necessary steam is obtained from the liquid water part of the slurry. In other embodiments, for instance where relatively dry carbonaceous material is being used as the feedstock, all the steam can be generated, for instance using a steam generator, and this fed into the steam hydrogasifier. The steam hydrogasification process can operate without a) reaction catalysts and/or other initiating agents, for instance hot solids; b) without the injection of oxygen (i.e. POX systems, or otherwise) prior to the SHR or during the SHR step; and/or c) without preheating the carbonaceous material prior to entry into the SHR. The aforementioned hot solids typically have melting points in excess of the hydrogasification temperatures used, and are used as the heat source for heating up the carbonaceous feed in the hydrogasifier. These solids, can be, but are not limited to, sand, petroleum coke, coal char, ash particles. Moreover, some solids may have catalytic activity for the promotion of hydrogenation. Temperatures range of between 700° C. to about 1000° C., and pressures about 132 psi to 560 psi (preferably between 150 psi to 400 psi) can be used in the steam hydrogasifier. The steam hydrogasifier reactor (and shift reactor) can be batch reactors or fluidized bed reactors.

Process Configurations for High $CH_4$ Syngas Production Using the SHR Gasifier

In one embodiment, steam hydrogasification of carbonaceous feedstocks results in improved carbon conversion compared to hydrogasification. SHR also generates a product gas with considerable amount of methane compared to conventional partial oxidation gasifiers. Methane production from the SHR can be from 0.2 to 40%; preferably 10-40%, more preferably, 30-40% on a dry mole basis. In this embodiment, further downstream processing, for instance methanation, is not required for facilitating methane production. In other embodiments, an addition downstream methanation process can be added to the process, as disclosed, to generate even more methane. Such methanators, and their processes, are well known to those of skill in the art.

In one embodiment, all the hydrogen required for the steam hydrogasification is obtained from the shift reactor (see below). In other embodiments, hydrogen for the steam hydrogasification can be obtained from an external source (such as using steam reforming of natural gas); and in further embodiments hydrogen can be obtained from the combination of a shift reactor and an external source.

In one embodiment, an SHR can be used without a shift reactor to generate high concentrations of methane. In another embodiment, the steam hydrogasification reactor can be coupled with a shift reactor, resulting in a gasifier configuration that also generates a syngas with high methane concentrations. In this embodiment with the shift reactor, the issue of hydrogen supply has been resolved by recycling a portion of the hydrogen generated by the shift reactor. This configuration also allows considerable control over the final product gas composition.

SHR gasification produces a high methane containing syngas. The slurry made of the carbonaceous feed (coal) and water, along with the recycled hydrogen are fed to the SHR, operating at approximately 850° C. and 400 psi.

The SHR generates a high methane content product gas that can be subjected to warm gas cleanup in order to remove contaminants such as sulfur. The gas cleanup can be performed at a temperature above the dew (or boiling) point of water. This will allow the unreacted steam from the SHR to be directly fed into the shift reactor along with the product gas. In one embodiment, the SHR serves as the sole steam source for the shift reactor, where the steam generated by the SHR is sufficient to supply the shift reactor. In other embodiments, steam for the shift reactor can be obtained from a combination of the SHR and other sources, such as a steam generator. In yet another embodiment, steam for the shift reactor is obtained only from a steam generator.

In the shift reactor, the CO present in the clean product gas reacts with the steam to produce $H_2$. Methane is inert in the shift reactor. This product gas is then cooled down and $H_2$ is separated for recycle to the SHR as feed. The recycle hydrogen stream eliminates the hydrogen supply problem for the SHR. The final product gas contains high quantity of methane.

Operating temperatures for the shift reactor can be between 200 to 450° C. and at 132 psi to 560 psi (preferably between 150 psi to 400 psi).

In another embodiment, the SHR product gas can be fed into the shift reactor without first undergoing the clean up process. In this case, the shift reactor will be operated as a 'sour-shift' reactor with a special sulfur tolerant catalyst. The final product gas can then be subjected to cleanup under ambient conditions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process and apparatus described in the specification. As one of ordinary skill in the art will readily appreciate from the disclosure of the present invention, processes and apparatuses, presently existing or later to be developed that perform substantially the same function or achieve substantially the same result as the corresponding embodiments described herein may be utilized according to the present invention. Accordingly, the appended claims are intended to include such processes and use of such apparatuses within their scope.

REFERENCES

The following publications are incorporated by reference herein in their entirety:
1. "Key World Energy Statistics," International Energy Agency, 2008.
2. J. L. Figueiredo and J. A. Moulijn, "Carbon and Coal Gasification," in NATO ASI Series: Martin Nijhoff Publishers, 1986.
3. C. Higman and M. van der Burgt, Gasification: Elsevier, 2003.
4. P. L. Walker Jr., F. Ruskino Jr., and L. G. Austin, "Gas reactions of carbon," Advances in Catalysis, vol. 11, pp. 133-221, 1959.
5. E. P. Deurwaarder, H. Boerrigter, H. Mozaffarian, and B. van der Drift, "Methanation of Milena product gas for the production of bio-SNG," in 14th European Biomass Conference & Exhibition Paris, France, 2005.
6. J. M. Norbeck and C. E. Hackett, "Production of synthetic transportation fuels from carbonaceous material using self-sustained hydrogasification." U.S. Pat. No. 7,208,530 B2 USA, 2007.
7. A. S. K. Raju, C. S. Park, and J. M. Norbeck, "Synthesis gas production using steam hydrogasification and steam reforming," Fuel Processing Technology, In Print, vol. doi: 10.1016/j.fuproc.2008.09.011, 2008.
8. S. K. Jeon, C. S. Park, C. E. Hackett, and J. M. Norbeck, "Characteristics of steam hydrogasification of wood using a micro-batch reactor," Fuel, vol. 86, pp. 2817-2823, 2007.

What is claimed is:

1. A process for converting carbonaceous material into methane-rich fuel gas, comprising:
    simultaneously heating in a steam hydrogasification reactor the carbonaceous material in the presence of both hydrogen and steam, at a temperature and pressure sufficient to generate a stream of methane and carbon monoxide rich product gas;
    subjecting the methane and carbon monoxide rich produce gas in a shift reactor to a shift reaction to thereby form a shifted methane rich produce gas, wherein steam for the shift reaction is provided by the unreacted steam from the steam hydrogasification reactor;
    wherein the carbon monoxide in the product reacts in the shift reactor with steam to produce hydrogen, and wherein the steam used to react with the carbon monoxide in the shift reactor is obtained only from the steam hydrogasification reactor; and
    separating the hydrogen from the shifted methane rich product gas, and recycling at least part of the separated hydrogen to the steam hydrogasification reactor.

2. The process of claim 1, wherein the carbonaceous material is provided in slurry form.

3. The process of claim 1, whereby methane content of the methane and carbon monoxide rich product gas is between 10 to 40% on a mole basis.

4. The process of claim 1, whereby methane content of the methane and carbon monoxide rich product gas is between 30-40% on a dry mole basis.

5. The process of claim 1, wherein all of the separated hydrogen is recycled back into the steam hydrogasification reactor.

6. The process of claim 1, wherein the heating is performed without a catalyst.

7. The process of claim 1, wherein the heating is performed without the injection of oxygen.

8. The process of claim 1, further comprising a step of removing sulfurous contaminants from the product gas before the step of subjecting the methane and carbon monoxide rich product gas in a shift reactor to a shift reaction.

9. The process of claim 8, wherein the step of simultaneously heating is carried out at a temperature between 700-1000° C., and wherein the step of removing the sulfurous contaminants is performed at a temperature that is above a dew point of water.

10. The process of claim 1, further comprising a step of controlling the composition of the product gas from the steam hydrogasification reaction by varying the steam to carbon and the H2 to carbon ratio of the feed.

11. The process of claim 1 wherein the carbonaceous material comprises municipal waste, biomass, wood, coal, biosolids, or a natural or synthetic polymer.

12. A process for converting a slurry of carbonaceous material in water into methane-rich fuel gas, comprising:
  simultaneously heating in a hydrogasification reactor the carbonaceous material in the presence of both hydrogen and steam, at a temperature and pressure sufficient to generate a stream of methane and carbon monoxide rich product gas,
  wherein all of the steam required for the hydrogasification is formed from the water in the slurry, and
  feeding the product gas to a shift reactor, wherein the carbon monoxide of the product gas reacts with unreacted steam from the steam hydrogasification reactor at a temperature of between 200 to 450° C. to produce hydrogen, and wherein the methane is insert at the temperature in the shift reactor to thereby form a methane rich shifted product gas.

13. A process for converting a slurry of carbonaceous material in water into methane-rich fuel gas, comprising:
  simultaneously heating in a steam hydrogasification reactor the carbonaceous material in the presence of both hydrogen and steam, at a temperature and pressure sufficient to generate a stream of methane and carbon monoxide rich product gas that further contains unreacted steam:
  wherein all of the steam required for the hydrogasification is formed from the water in the slurry;
  removing sulfurous contaminants from the product gas in the presence of the unreacted steam;
  subjecting the carbon monoxide in the produce gas in a shift reactor to a shift reaction at a temperature at which methane is inert to thereby form a shifted methane rich produce gas, wherein steam for the shift for shift reaction is provided by the unreacted steam; and
  separating hydrogen from the shifted methane rich product gas, and recycling at least part of the separated hydrogen to the steam hydrogasification reactor.

* * * * *